United States Patent [19]

Lythall et al.

[11] 4,039,798
[45] Aug. 2, 1977

[54] UNDERWATER WELDING

[75] Inventors: David John Lythall, Hertford; Eric Martin Wilson, Weston-Super-Mare, both of England

[73] Assignee: BOC International Limited, London, United Kingdom

[21] Appl. No.: 585,661

[22] Filed: June 10, 1975

[30] Foreign Application Priority Data

June 10, 1974 United Kingdom ............... 25596/74

[51] Int. Cl.² ............................................. B23K 9/00
[52] U.S. Cl. .................................. 219/72; 219/121 P; 219/137 R
[58] Field of Search ........... 219/121 P, 72, 75, 137 R; 61/69 R

[56] References Cited

U.S. PATENT DOCUMENTS

| 3,521,022 | 7/1970 | Sato | 219/72 |
| 3,581,042 | 5/1971 | Pilia | 219/72 X |
| 3,632,950 | 1/1972 | Berghof | 219/72 |
| 3,876,852 | 4/1975 | Topham | 219/72 |
| 3,898,418 | 8/1975 | Hansui | 219/121 P |

Primary Examiner—Bruce A. Reynolds
Assistant Examiner—Fred E. Bell
Attorney, Agent, or Firm—Dennison, Dennison, Meserole & Pollack

[57] ABSTRACT

A process for arc welding in an underwater environment wherein a welding chamber is positioned adjacent a workpiece and an arc welding torch is positioned therein. A gas under pressure is introduced into the chamber to displace the water and a gas is supplied to the torch at a pressure greater than the pressure of the gas in the chamber.

6 Claims, 3 Drawing Figures

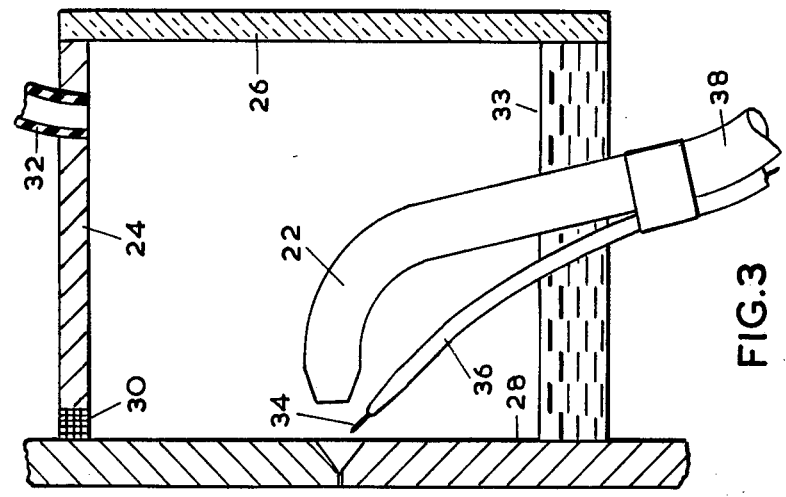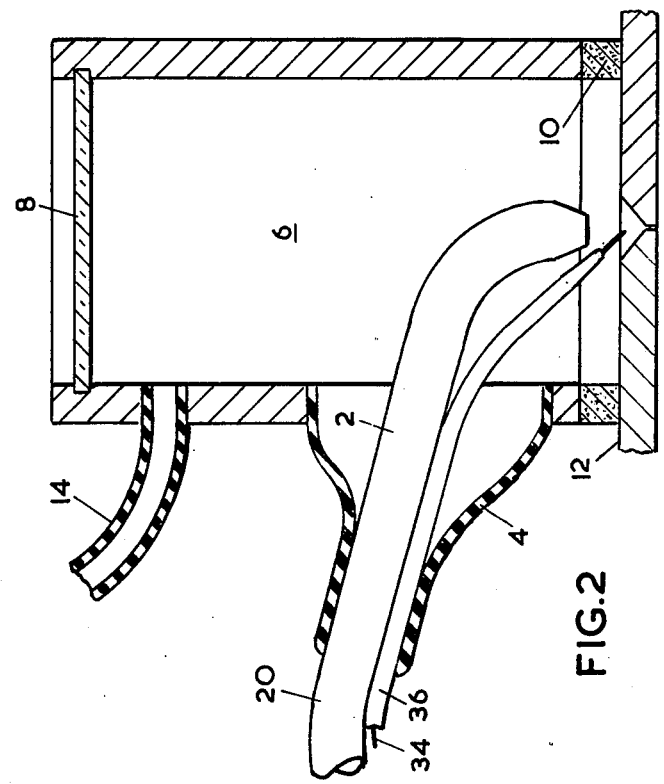

UNDERWATER WELDING

This invention relates to underwater welding and particularly to apparatus for welding at great depth under water i.e. about 75m and below.

In known underwater welding apparatus, welding is carried out by using an electric arc produced by a MIG torch in a welding chamber which provides a localised shielding gas environment for the weld. To prevent water from flowing into the chamber, the pressure of the gas in the chamber must be kept slightly higher than the ambient water pressure. The pressure of gas in the chamber must therefore be increased as the depth of water increases.

At great depths it has been found that the high pressure of the surrounding gas has adverse effects on the MIG arc. In order to maintain an arc at a desired length at a given wire feed rate (current), the voltage must be increased as the ambient gas pressure increases. This causes unstable welding conditions, and the arc itself may be extinguished for a period of one second or longer. Also, the arc becomes constricted pneumatically, which adversely affects the metal transfer process, resulting in welding difficulties and poor weld deposits. A large amount of spatter may also be produced.

It is the aim of the present invention to provide an improved process for welding underwater at great depths.

Accordingly the present invention provides a process for gas-shielded arc welding at great depths underwater, substantially as claimed in the appended claims.

The invention will now be described by way of example with reference to the accompanying drawing, in which:

FIG. 2 shows a section through one type of underwater welding apparatus of the present invention, and FIG. 3 shows a section through a second type of underwater welding apparatus of the present invention.

Figure 1:
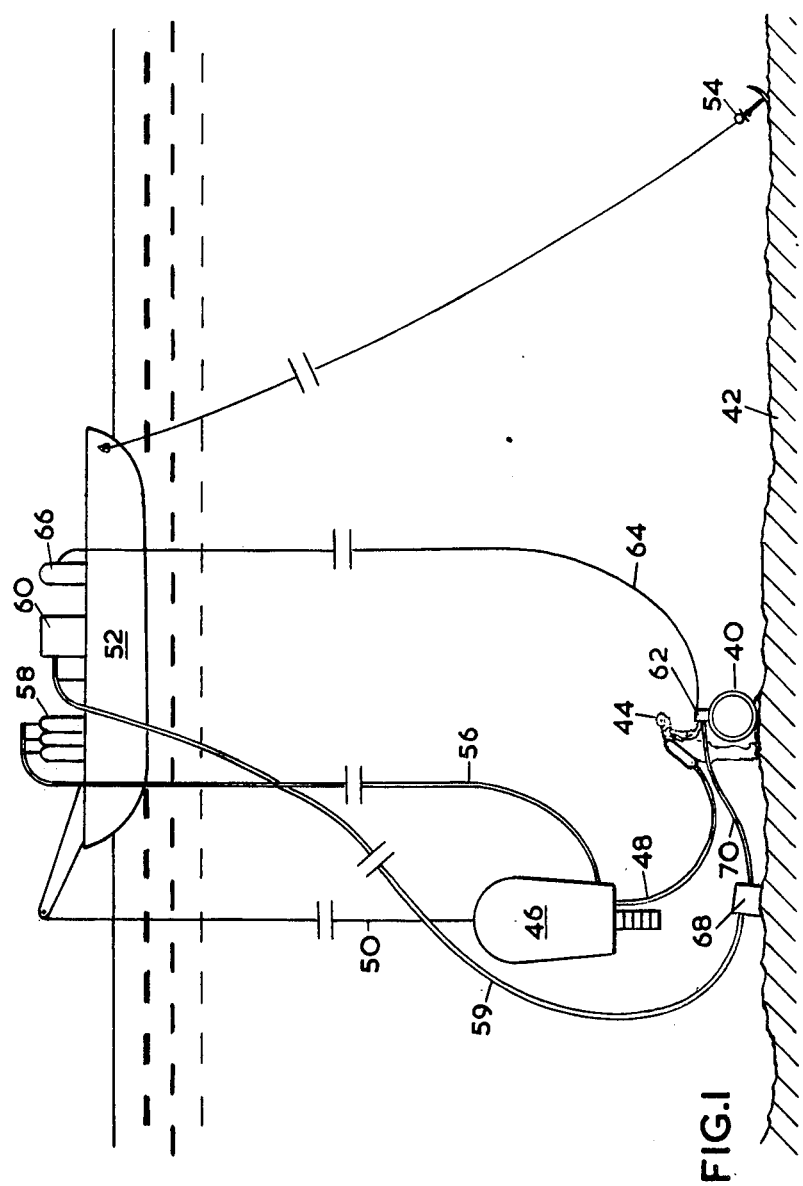
FIG. 1 is a diagrammatic view of apparatus for carrying out the process of the present invention at great depths under water.

The process of the present invention is intended to be carried out at great depths. As shown in FIG. 1, the pipeline 40 or other workpiece requiring to be welded can be lying at the sea bed 42, or it can extend upwardly therefrom. The welder/diver 44 is connected to a diving bell 46 by an umbilical cord 48 along which pass helium and oxygen (or other exotic gas mixtures) for breathing purposes, as normal respirable gases become toxic or dangerous at the depths at which the invention can be practised.

The bell 46 is supported by a cable 50 coming from a winch carried by a barge 52 held in place over the welding site by several anchors, of which only one is shown, at 54.

The heli-ox mixture is preferably supplied to bell 46 by a conduit 56 connected to gas cylinders or other vessels 58 carried by the barge 52.

The welding torch for carrying out the present invention is for carrrying out gas-shielded electric arc welding. The torch is of the TIG or constricted-arc (plasma) type. In addition to needing a high-amperage, low-voltage power supply, it also needs a supply of a suitable shielding gas under high pressure. These "consumables" are supplied through cable 59 from an electric generator and gas cylinder on barge 52, and indicated at 60.

The torch is intended to operate in a welding chamber 62 positioned over the site of the weld and designed to be evacuated of water so that the weld is 'dry'. The chamber is supplied with gas under pressure by a hose 64 connected to a gas cylinder 66 on barge 52. The gas from hose 64 may be admitted to the chamber 62 either intermittently, under the control of the diver, or continuously at a preset rate.

With plasma or TIG welding, the electric arc is used merely to melt the metal of the workpiece to form the weld puddle. In order to make a butt or other weld, it is necessary to deposit additional metal. Such metal is normally supplied by a filler wire 34 which is fed along its length into the arc zone, where is becomes fused and falls, is sprayed, or otherwise enters the weld puddle. The filler wire is preferably supplied by being fed along a conduit 36 shown in more detail in FIGS. 2 and 3. The conduit 36 leads from the torch 2 to a wire feed unit 68 resting on the sea bed. The electricity and gas supplies for the welding torch, and the electricity supplies for the feed unit, are supplied by cable 59 to the feed unit. From unit 68 the electricity and gas for the torch, and a signal cable for the wire feed unit 68, pass to the torch by a cable 70.

With reference to FIG. 2, a plasma welding torch or TIG welding torch 2 is mounted in a flexible boot 4 of a welding chamber 6. The chamber 6 has at one end a window 8 through which a welder can inspect the weld. At the other end of the chamber is a porous seal 10 which can be pressed into contact with a workpiece 12. This seal prevents gas leaving the chamber at more than a chosen rate, thus maintaining a gaseous environment inside the chamber. Gas is fed into the chamber through a flexible pipe 14. The flow of gas through the chamber entrains any welding fume produced and removes it as the gas is discharged into the surrounding water. The pressure of the gas in the chamber 6 must be slightly greater than the pressure of the water outside, otherwise there is a risk that water will enter the chamber through the seal 10 and contaminate the weld. As the hydrostatic pressure increases with depth, the pressure of the gas in the chamber must also increase to keep the water out. Provision is made for separate addition of filler wire into the arc zone through a conduit 36 secured to the body of the welding torch. The filler wire is mechanically fed through the conduit 36 from the wire feed unit 68. Filler wire may also be fed into the weld from a conduit fixed to the chamber and directed into the weld puddle, in an alternative embodiment. Power, shielding gas and control lines are taken to the torch through an umbilical cable assembly 20.

In FIG. 3, a plasma (or constricted arc) welding torch, or alternatively a TIG welding torch 22, is freely hand-held inside an annular welding chamber 24, constructed from metal or plastics, but having a transparent side window 26 allowing vision of the weld. The chamber is sealed to the workpiece 28 by means of a non-porous seal material 30 fixed to the appropriate edges of the chamber. The chamber 26 of FIG. 3 is intended to encircle an upright tubular workpiece 28. In the position shown, the bottom face of the chamber is left open to the water, allowing the welder's hand and torch access to the inside of the chamber. Gas is fed to the chamber through a tube 32, and escapes through the open base of the chamber, having displaced the water in the chamber. The gas pressure in the chamber must be slightly greater than the pressure of the water outside, otherwise the water level 33 in the chamber will rise and contaminate the weld. The chamber is held to the workpiece by means of mechanical or magnetic clamps, thus maintaining a firm seal.

The welder is free to manipulate the welding torch through the open base of the chamber. Although provision may be made to add filler wire manually, the welder using his other hand to do this, preferably the filler wire 34 is mechanically fed through a flexible conduit 36 having its exit end secured to the body 22 of the torch, the wire being driven through the conduit by means of the underwater wire feed unit 68. Electrical and gas supply lines, and electrical control lines, to the torch are provided in an umbilical cable assembly 38.

A third embodiment of this invention is provided by undertaking completely mechanised plasma or TIG welding underwater at depth, using a mechanical drive system to traverse the welding torch along or around the workpiece, the torch being contained in a known underwater baffle assembly, providing a localised gas environment around the weld, and allowing adjustment of seal pressure and torch position.

In a plasma welding torch, the arc, struck between the workpiece and the non-consumable electrode in the torch, is already constricted by means of a nozzle orifice, through which a stream of thermally-ionised gas flows, and the voltage necessary to sustain such an arc is relatively high. The high pressure in the welding chamber necessary for welding at great depth causes an arc of a MIG torch to become unstable unless the voltage is increased, but has little effect on the arc of a plasma torch because of its lower sensitivity to voltage variations. Therefore the arc of a constricted-arc (plasma) torch does not extinguish when the welding apparatus is used at depth.

Furthermore, the MIG arc becomes pneumatically constricted at high ambient gas pressures, in turn affecting adversely the metal transfer process which occurs across the MIG arc from the consumable electrode wire. In the plasma process the arc is already constricted, and thus less sensitive to increase in ambient pressure, and employs separate filler wire addition, if required, which does not interrupt the arc plasma. Therefore, if a separate filler wire is used with a plasma torch, the filler metal addition is not adversely affected by the increase in surrounding pressure. This is because the wire is fed into the leading edge of the molten pool separate from the arc plasma, and is not fed axially through the arc as in a MIG torch, in which the filler wire acts as a consumable electrode. This also means that the plasma process does not produce spatter, whereas spatter does occur when using the conventional MIG short-circuiting welding arc.

Similarly, the arc in a TIG welding torch is struck between a non-consumable electrode in the torch and the workpiece. The arc will become constricted when operated at high ambient pressures, but as filler wire is fed into the arc at the leading edge of the molten pool and not axially through the arc as in the MIG process, the filler wire addition is not adversely affected by the constriction of the arc caused by high ambient pressure in the chamber, and the increased voltages needed to sustain the arc. Also, welding apatter is eliminated when using the TIG process in a chamber at depth.

The advantages of the use of a gas-shielded arc welding torch in which the arc is struck between a non-consumable electrode in the torch and the workpiece, and in which the filler wire, if required, is fed into the arc at the leading edge of the molten pool, separately from the arc, are found not only in the types of welding chambers illustrated in the diagram, but also in other types of chambers providing localised gas environments for welding underwater.

We claim:

1. A process for deep water gas shielded arc welding including the steps of positioning a welding chamber adjacent to an underwater workpiece to be welded; injecting a pressurized gas into said chamber at sufficient pressure to displace the water from the interior of said chamber and to maintain said displacement in response to variations in outside pressure to expose part of the surface of the workpiece to said gas; introducing a non-consumable electrode welding torch of the constricted arc type into the gas-filled space in said chamber and supplying gas to said torch at a pressure significantly greater than the pressure of the gas within said chamber.

2. A process as claimed in claim 1, including introducing filler wire to the arc zone within the chamber from a source remote therefrom.

3. A process as claimed in claim 2, in which the filler wire is introduced into the weld puddle produced by the arc at a position located in front of the arc relative to the direction of movement of the torch.

4. Apparatus for gas-shielding arc welding at great depths under water, including a welding chamber adapted to be supplied with gas under pressure so as to displace water from within it, and a permanent electrode welding torch of the constricted arc type connected to the chamber in a fluid-tight manner permitting relative movement between the torch and chamber.

5. Apparatus as claimed in claim 4, in which the torch is connected to the chamber by a boot of flexible and watertight material sealed at one end to the torch or supply cable thereto, and at the other end to a wall of the welding chamber.

6. A process for deep water gas shielded arc welding including the steps of positioning a welding chamber adjacent to an underwater workpiece to be welded; injecting a pressurized gas into said chamber at sufficient pressure to displace the water from the interior of said chamber and to maintain said displacement in response to variations in outside pressure to expose part of the surface of the workpiece to said gas; introducing a non-consumable electrode welding torch of the constricted arc type into the gas-filled space in said chamber and supplying gas to said torch at a pressure significantly greater than the pressure of the gas within said chamber; and introducing filler wire into the weld puddle produced by the arc at a position located in front of the arc relative to the direction of movement of said torch.

* * * * *